United States Patent [19]

Putnam

[11] Patent Number: 4,756,495
[45] Date of Patent: * Jul. 12, 1988

[54] CONVERSION KIT FOR MOUNTING A RADIO SUBSTITUTED FOR ORIGINAL RADIOS IN AUTOMOTIVE VEHICLES

[75] Inventor: Rob R. Putnam, Simi Valley, Calif.

[73] Assignee: Scosche Industries, Inc., Simi Valley, Calif.

[*] Notice: The portion of the term of this patent subsequent to Apr. 28, 2004 has been disclaimed.

[21] Appl. No.: 915,404

[22] Filed: Oct. 6, 1986

Related U.S. Application Data

[63] Continuation of Ser. No. 743,309, Jun. 10, 1985, Pat. No. 4,660,789.

[51] Int. Cl.$^4$ .............................................. G12B 9/00
[52] U.S. Cl. .................................... 248/27.3; 439/298
[58] Field of Search .................... 248/27.3, 27.1, 558, 248/231.8, DIG. 6, 342-344, 205.1; 339/131; 174/58; 455/345; 312/245; 200/295, 296

[56] References Cited

U.S. PATENT DOCUMENTS

| | | |
|---|---|---|
| 1,623,274 | 4/1927 | Robinson . |
| 2,031,861 | 2/1936 | Simek ........................ 248/DIG. 6 X |
| 2,126,259 | 8/1938 | Howells .................... 248/DIG. 6 X |
| 2,658,704 | 11/1953 | Smith . |
| 2,821,566 | 1/1958 | Wiley . |
| 3,297,977 | 1/1967 | Smith . |
| 3,366,727 | 1/1968 | Rueger . |
| 3,384,987 | 5/1968 | Prechtl . |
| 3,685,879 | 8/1972 | Tsuji . |
| 3,710,096 | 1/1973 | McFarlin . |
| 3,799,483 | 3/1974 | Chiappinelli . |
| 3,884,441 | 5/1975 | Barry ........................ 248/DIG. 6 X |
| 3,906,371 | 9/1975 | Tsuji . |
| 3,922,047 | 11/1975 | Tsuji . |
| 3,964,705 | 6/1976 | Giovanni . |
| 4,068,175 | 1/1978 | Maniaci . |
| 4,183,486 | 1/1980 | Gsoldi ........................ 248/DIG. 6 X |
| 4,211,976 | 7/1980 | Inoue . |
| 4,226,393 | 10/1980 | Rardin . |
| 4,274,330 | 6/1981 | Witten et al. . |
| 4,313,584 | 2/1982 | Fukunaga . |
| 4,336,673 | 6/1982 | Duchesne et al. . |
| 4,340,795 | 7/1982 | Arthur . |
| 4,365,280 | 12/1982 | Crosetti et al. . |
| 4,372,509 | 2/1983 | Krainhofer . |
| 4,378,099 | 3/1983 | Ikeda . |
| 4,462,564 | 7/1984 | Alves . |
| 4,488,206 | 12/1984 | Mizusawa ..................... 248/27.3 X |
| 4,524,933 | 6/1985 | Rouws ........................... 248/27.3 |
| 4,555,080 | 11/1985 | Nara . |
| 4,560,124 | 12/1985 | Alves . |
| 4,572,465 | 2/1986 | Rasca ..................... 248/DIG. 6 X |
| 4,577,818 | 3/1986 | Clarisse . |

FOREIGN PATENT DOCUMENTS 957490  2/1957  Fed. Rep. of Germany ..... 248/27.3

Primary Examiner—Reinaldo P. Machado
Assistant Examiner—A. Chin-Shue
Attorney, Agent, or Firm—William W. Haefliger

[57] ABSTRACT

A conversion kit for use between a vehicle radio housing and a front trim panel, and adapting to the panel and radio as well as to an instrument panel that receives the radio, the kit comprising (a) a mounting panel unit having an opening therethrough to receive a frontwardly projecting portion of the radio structure, the mounting panel being rectangular, and defining four corners, longitudinally elongated opposite edges and laterally elongated opposite edges, (b) the panel unit forming four pairs of slots, respectively located proximate said four corners, the slots of each pair being longitudinally spaced apart and being alike to selectively receive and retain one locking clip in one slot of each pair, the slots oriented so that the four clips are receivable in the slots to unidirectionally slide into retaining engagement with edge portions of the instrument panel, while also adjustably attaching to the panel unit to block reverse sliding thereof, except when released.

21 Claims, 2 Drawing Sheets

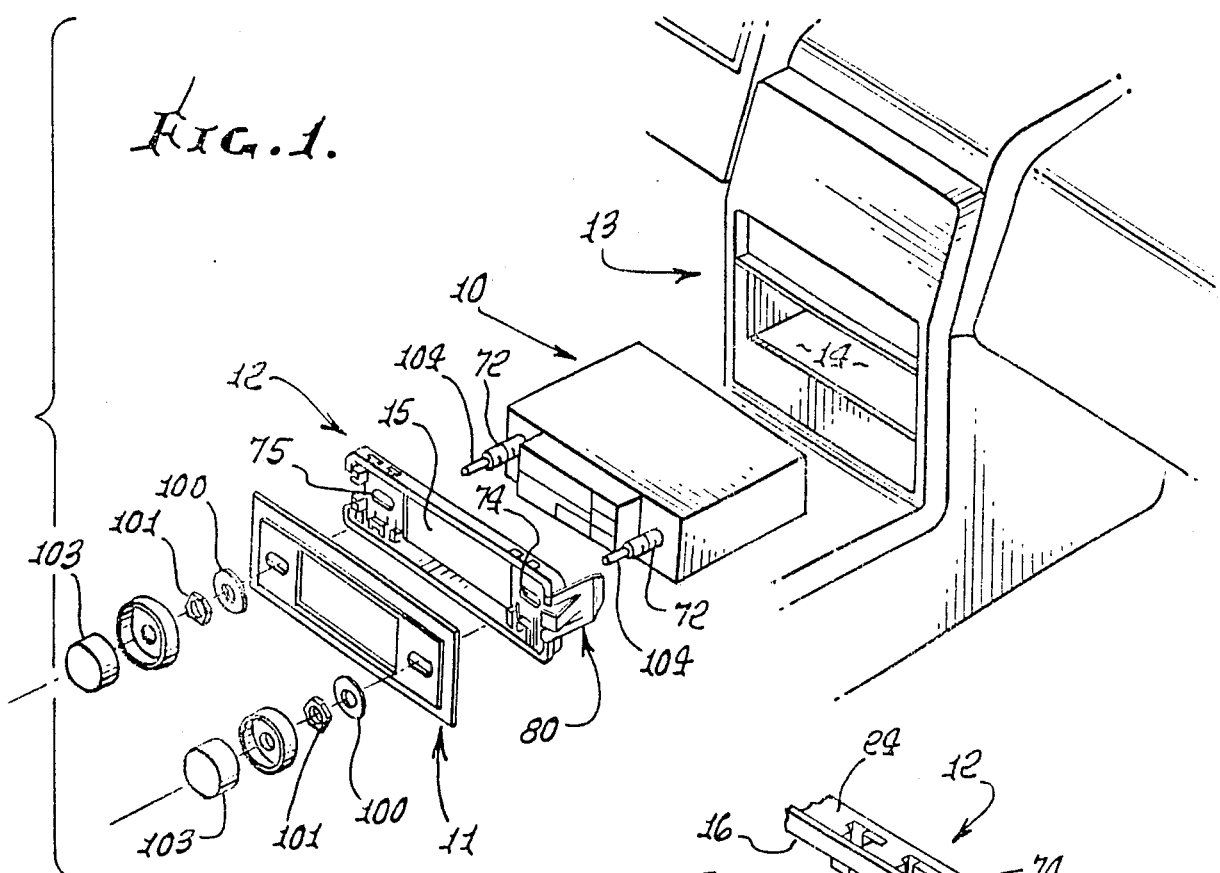
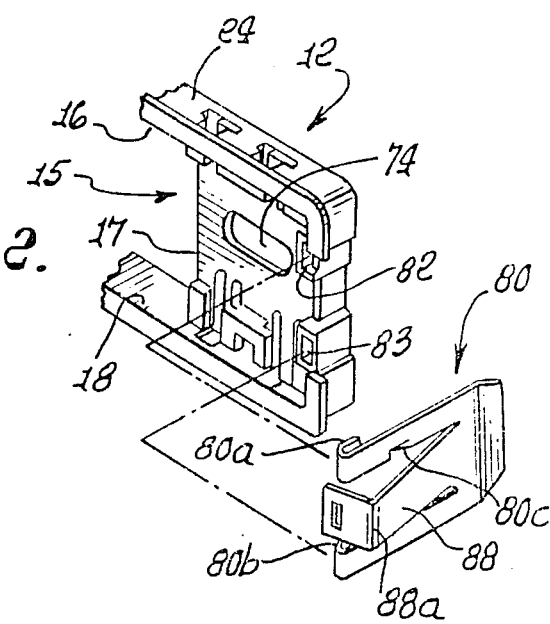
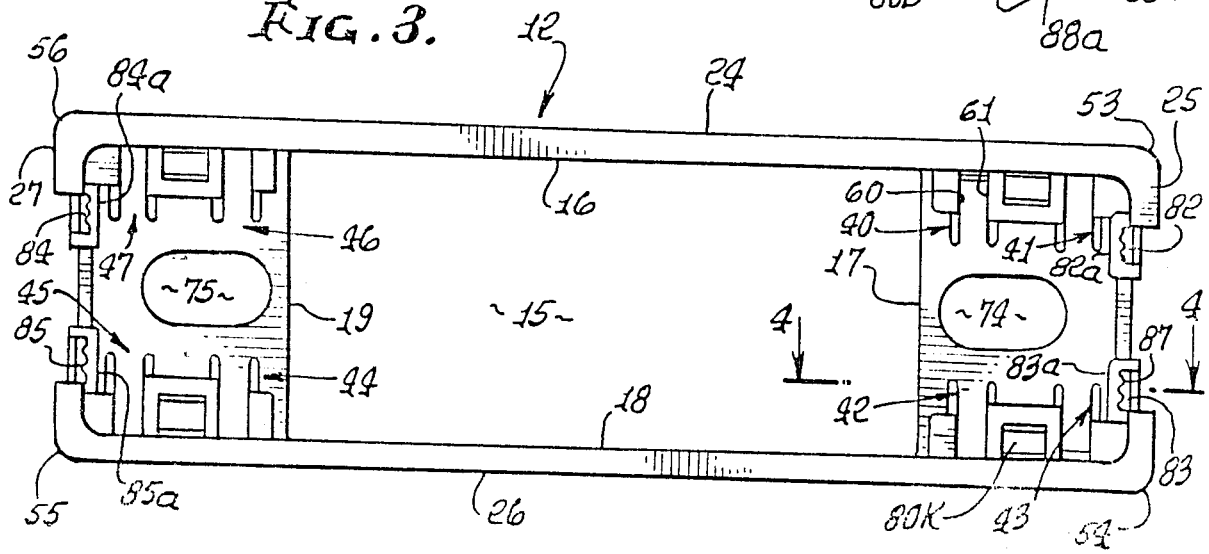

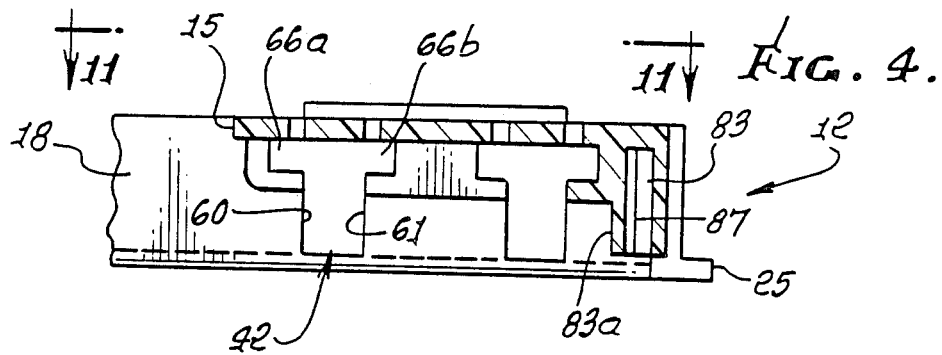
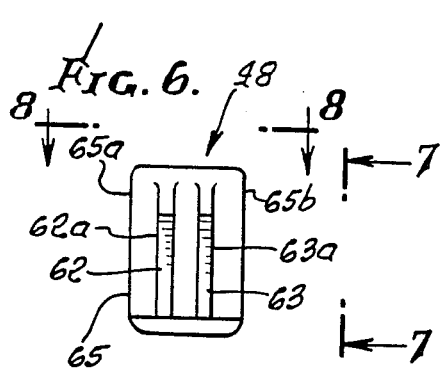
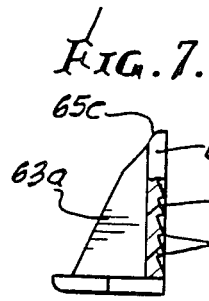
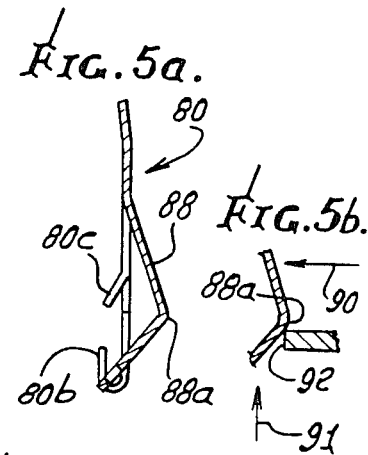
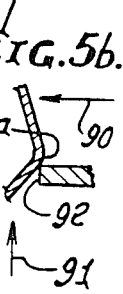
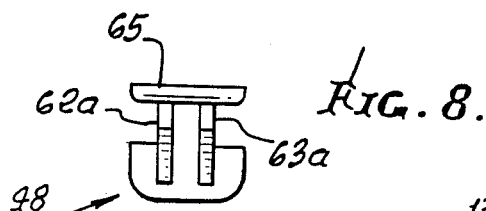
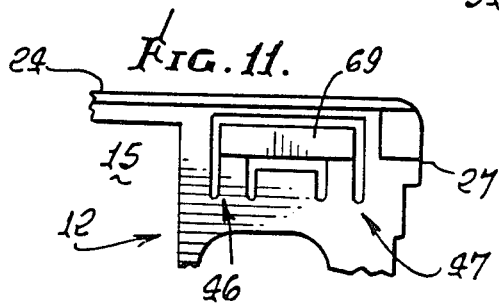
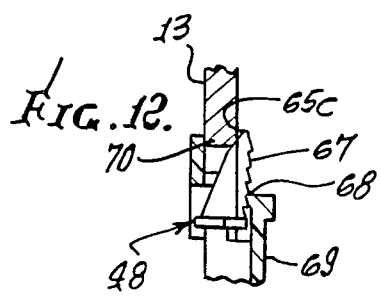
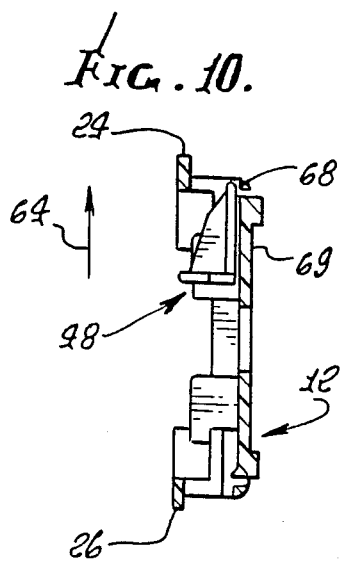
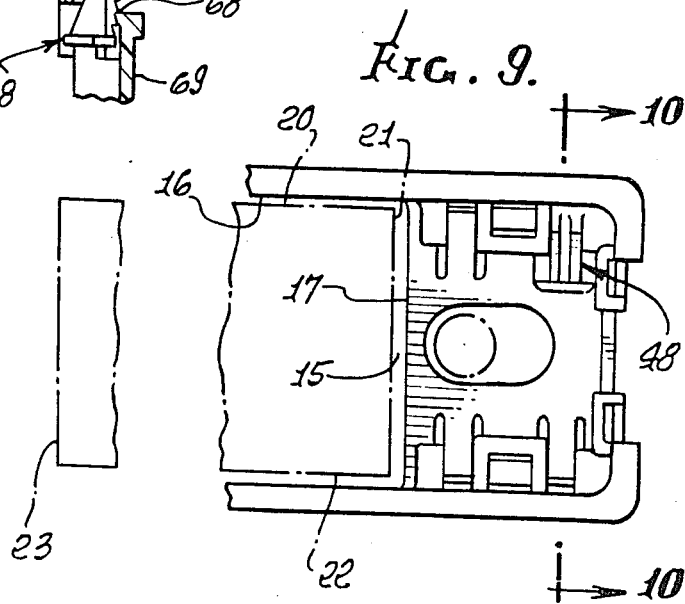

CONVERSION KIT FOR MOUNTING A RADIO SUBSTITUTED FOR ORIGINAL RADIOS IN AUTOMOTIVE VEHICLES

This is a continuation of application Ser. No. 743,309, filed June 10, 1985, now U.S. Pat. No. 4,660,789, issued 4/28/87.

BACKGROUND OF THE INVENTION

This invention relates to a conversion kit to facilitate the mounting of substitute equipment such as a radio, tape player/equalizer in an automobile instrument panel, such equipment substituted for the original equipment radio, or converting a standard two shaft car stereo turner/tape player to a rectangular opening of a typical European or Japanese automobile.

It has become quite common in the contemporary automobile market for owners to want to substitute for the original equipment radio, (or dummy panel when the car comes equipped without a radio), that is in the car when new, a radio of a different type. Typically, the original equipment radio is mounted or installed in a cavity in the instrument panel of the automobile, with a trim frame or panel around the control panel of the radio.

Present day automobiles differ in style and appearance including the size and location of the cavity in which the radio is installed. Conversion kits have been available wherein a frame is inserted into the cavity after the radio has been removed, to facilitate installation of a different radio. However, a large assortment of different conversion kits is necessary in order to fill the requirements of different automobiles having different instrument panel designs.

Thus, there is a strong need in the art for a conversion kit having the capability of serving its purpose in a large variety of different automobiles.

SUMMARY OF THE INVENTION

It is a major object of the invention to provide a simple yet universal conversion kit, which will meet the above need. Basically, the invention is embodied in a device which comprises:

(a) a mounting panel unit having an opening therethrough to receive a frontwardly projecting portion of the radio structure, the mounting panel being rectangular, and defining four corners, longitudinally elongated opposite edges and laterally elongated opposite edges, (b) the panel unit forming four pairs of slots, respectively located proximate the four corners, the slots of each pair being longitudinally spaced apart and being alike to selectively receive and retain one locking clip in one slot of each pair, the slots oriented so that the four clips are receivable in the slots to unidirectional slide into retaining engagement with edge portions of the instrument panel, while also adjustably attaching to the panel unit to block reverse sliding thereof.

As will be seen, the panel may also form fifth and sixth slots proximate such laterally elongated opposite edges for reception of spring clips to project rearwardly from a plane defined by the panel, and to fittingly and yieldably engage instrument panel structure. Typically the panel has longitudinally spaced, longitudinally elongated openings that extend forwardly therethrough to receive forwardly elongated fasteners defined by the radio structure, with each of said openings located generally between two pairs of said slots that are laterally spaced apart. Also, each of the fifth and sixth slots includes a pair of slots adjacent panel opposite end walls that define said opposite edges.

Further the four locking clips may be received and retained in said selected slots, the clips consisting of plastic; and the spring clips having legs received in said fifth and sixth slots, the spring clips consisting of metal.

These and other objects and advantages of the invention, as well as the details of an illustrative embodiment, will be more fully understood from the following specification and drawings in which:

DRAWING DESCRIPTION

FIG. 1 is an exploded perspective showing employment of the kit, in one mode of use;

FIG. 2 is an enlarged perspective and exploded view showing details of connection of a spring clip to the panel;

FIG. 3 is an enlarged front elevation showing details of the panel unit;

FIG. 4 is an enlarged section taken in lines 4—4 of FIG. 3;

FIG. 5a is an edge view of a spring clip attachable to the panel unit; and FIG. 5b is a fragmentary view showing deflection of a tongue on the spring clip, thereby retaining the panel unit to instrument panel structure;

FIG. 6 is a front elevation showing details of one of four like plastic clips;

FIG. 7 is a side elevation on lines 7—7 of FIG. 6; and FIG. 8 is a top plan view on lines 8—8 of FIG. 6;

FIG. 9 is a fragmentary view of one end of the panel unit, as also seen in FIG. 3; but with a plastic clip partially inserted into grooving defined by the panel unit;

FIG. 10 is a section taken on lines 10—10 of FIG. 9;

FIG. 11 is a fragmentary view on lines 11—11 of FIG. 4, showing the reverse side (corner portion) of the panel unit; and FIG. 12 is a view like FIG. 10 showing the plastic clip fully inserted into panel unit grooving, unidirectionally upwardly, and into retaining engagement with an instrument panel edge portion.

DETAILED DESCRIPTION

The conversion kit of the invention is usable between a vehicle radio housing, as for example is seen at 10 in FIG. 1, and a front trim panel, dash panel, indicated at 11. The kit includes a mounting panel unit 12, and brackets to be described, adapting to the radio housing 10 and to the front trim panel 11, as well as to an instrument panel 13 associated with the vehicle passenger compartment. The instrument panel 13 typically receives the radio as in a well 14.

Referring now to FIGS. 1, 2, 3 and 9, the kit mounting panel 12 has a central rectangular opening 15 therethrough to receive a frontwardly projecting portion of the radio housing. Thus, the edges 16–19 of the rectangular opening conform to the radio sub-housing sides 20–23, respectively. Panel 12 also has outer edges 24–27 defining its rectangular periphery. Edges 24 and 26 are longitudinally elongated, and edges 25 and 27 laterally elongated. Corners appear at 53–56.

The panel unit forms four like pairs of slots, respectively located proximate said four corners, the slots of each pair being longitudinally spaced apart and being alike to selectively receive one locking clip in one slot of each pair. Such slots are, for example, indicated generally at 40 and 41, 42 and 43, 44 and 45 and 46 and 47. The slots are oriented so that four like clips 48 are receivable in the slots, as in a selected slot of each pair; thus, the clips are unidirectionally slidable in the slots, and generally in planes parallel to the plane of unit 12, and toward and beyond edges or perimeters of the latter, so as to slide into retaining (and preferably interference) engagement with edge portions of the instrument panel, while also adjustably attaching to the panel unit, to block reverse sliding thereof.

More specifically, a groove such as at 40 has longitudinally spaced, laterally, extending walls 60 and 61 to slidably confine therebetween the lateral sides 62a and 63a of clip ribs 62 and 63 as the clip slides unidirectionally in the direction indicated by arrow 64 in FIG. 10. Also the clip has a base plate 65, longitudinally opposite edge portions 65a and 65b of which define tongues which slide into and through slot grooves 66a and 66b defined by the panel unit to retain the clip to the panel unit, during clip sliding. Further, the base plate 65 has a serrated face 67 having longitudinally extending, laterally spaced serrations 67a which rachet against a longitudinally extending detent or lip 68 integral with a cantilevered tongue 69 which is in turn integral with the molded plastic panel unit. Such interfering ratcheting or detenting action blocks reverse sliding of the clip in each of a series of positions corresponding to the serration spacing, and allowing adjustable interference and retaining engagement with an edge portion 70 of the instrument panel (see FIG. 12). Note angled cam end surface 65c of the clip, which cams against edge 70 as the clip ratchets toward that edge 70, and is blocked against reverse sliding, whereby a very good adjusted fit to the instrument panel is provided by each of the four clips, proximate the four corners of panel unit 12, retaining the unit to the instrument panel.

As respects the pairs of grooves, at each corner, the clip is inserted into that groove accomodating to the location of a fastener or fasteners 72 associated with the radio and projecting therefrom. Thus, if the spacing of and between the two fasteners 72 is wide, use the inner clip slots 40, 42, 44 and 46 for securing the kit to the instrument panel; whereas, if the fastener spacing is narrow, use the outer clip slots 41, 43, 45 and 47, for the clips. In this regard, the panel unit has longitudinally spaced, longitudinally elongated openings 74 and 75 that extend forwardly therethrough to receive the forwardly elongated fasteners 72 defined by the radio structure, each of said openings located generally between two pairs of said slots that are laterally spaced apart. Thus, opening 74 extends between slot pair 40 and 42, and pair 41 and 43; and opening 75 extends between slot pair 44 and 46, and pair 45 and 47. The clips 48 are removable by pressing against the bridge 80k between two tongues and sliding the clip inwardly toward slots 74 and 75, shown in FIG. 3. Slots 40, 42, 44 and 46 can also be used when two radio fasteners 72 are spaced in narrowed position; and slots 41, 43, 45 and 47 can be used when fasteners 72 are widened positions.

The panel also forms fifth and sixth slots proximate said laterally elongated opposite edges 25 and 27 for reception of two spring clips 80 to project rearwardly from a plane defined by the panel, and to fittingly and yieldably engage instrument panel structure. Note for example the fifth pair of slots 82 and 83 which are laterally spaced recesses extending rearwardly in bosses 82a and 83a proximate edge 25, and the sixth pair of slots 84 and 85 which are laterally spaced recesses extending rearwardly in bosses 84a and 85a proximate edge 27. Each such pair of fifth and sixth slots receives hook legs of one of the spring clips, such as legs indicated at 80a and 80b in FIG. 2, and also in FIG. 5a. Forwardly extending serrations 87 integral with the panel unit, and located in the slots or recesses, provide interference engagement with the legs, to frictionally retain the legs in the slots. Each metal clip 80 also includes an elbow 88a on a cantilever tongue 88, to deflect inwardly upon engagement with instrument panel edge structure 92 (see elbow 90 in FIG. 5b) in response to panel unit displacement toward the instrument panel (see arrow 91), and to spring back outwardly and block forward retraction of the clip, panel unit, and radio. Note that the hooked legs 80a and 80b, held in slots 82 and 83 position the clip or bracket 80, for cooperative engagement of tongue 88 and elbow 88a with instrument panel edge 92, blocking pull-out of unit 12. Structure 80c prevents clip pull-out from panel 12 by interference, when the unit is inserted in the instrument panel.

The fact that the panel unit 12 enables selective use of either plastic clips 48 (in each of two different modes, for different radio fastener configuration), or metal clips as at 80, for other instrument panel types, facilitates the versatility and universality of the device, as well as low cost, since the described slots to receive the different clips are all molded as part of a one-piece unit.

In FIG. 1, front trim plate 11 may be attached to the panel unit to cover and conceal its hollow interior, and the described slots. Plate 11 fits over the panel unit, and may be held in position by washer 100, and nuts 101 threadably attachable to threaded fastner sleeves 72. The knobs 103 attach to the tuning rods 104.

The panel and brackets may alternatively consist of stamped metal such as steel, or die cast metal such as zinc, aluminum or magnesium.

I claim:

1. In conversion kit use with radio structure including a vehicle radio housing and a front trim panel, and adapting to the panel and radio as well as to an instrument panel that receives the radio, the kit comprising (a) a mounting panel unit having an opening therethrough to receive a frontwardly projecting portion of the radio structure, the mounting panel being rectangular and having flange means, and defining four corners, longitudinally elongated opposite edges and laterally elongated opposite edges, (b) the panel unit forming multiple pairs of slots at said flange means, certain slots located proximate said four corners, the slots being longitudinally spaced apart to selectively receive and retain locking clips, the slots oriented so that four clips are receivable in the slots to unidirectionally slide into retaining engagement with edge portions of the instrument panel unit to block reverse sliding thereof, (c) and including said four clips which are generally L-shaped to have arms in the form of base plates that extend adjustably in said slots, the clips also having legs connected to the base plates, (d) each clip base plate having a serrated face to provide adjustable detent connection with a lip defined by the panel unit in each of a series of clip positions in the direction of sliding thereof, the lip yieldably supported by the panel unit, the clip also having guide rib means extending substantially normal to said base plate and in the direction of clip sliding, and the slots oriented to guidedly receive both the base plate and rib means of each clip, the rib means interconnecting the base plates and legs of the clips, and the rib means engaging edge portions of the panel.

2. The kit of claim 1 wherein the panel unit has longitudinally spaced, longitudinally elongated openings that extend forwardly therethrough to receive forwardly elongated fasteners defined by radio structure, each of said openings located generally between at least two of said slots that are laterally spaced apart.

3. The kit of claim 1 including said instrument panel structure, and said radio retained to the panel unit and received in a well defined by the instrument panel structure.

4. The kit of claim 1 wherein said multiple pairs of slots form four pairs of slots, and the panel also forms fifth and sixth slots proximate said laterally elongated opposite edges for reception of additional clips to project rearwardly from a plane defined by the panel unit, and to fittingly and yieldably engage instrument panel structure.

5. The kit of claim 4 wherein the panel unit has longitudinally spaced, longitudinally elongated openings that extend forwardly therethrough to receive forwardly elongated fasteners defined by the radio structure, each of said openings located generally between at least two of said slots that are laterally spaced apart.

6. The kit of claim 4 including said additional clips which are angled to have legs received in said fifth and sixth slots.

7. The kit of claim 4 wherein each of said fifth and sixth slots includes a pair of slots that define said opposite edges.

8. The kit of claim 6 wherein said additional clips are spring clips that include cantilevered tongues which have elbows to deflect upon engagement with instrument panel edge structure and block retraction of the clips and panel unit.

9. The kit of claim 8 wherein said legs are hook shaped to extend rearwardly into said fifth and sixth slots thereby to resist panel unit forward retraction relative to the instrument panel edge structure when said elbows and panel edge structure block spring clip retraction forwardly.

10. The kit of claim 1 wherein the clips consist of plastic.

11. The kit of claim 10 wherein each clip has a serrated face to provide adjustable detent connection with a lip defined by the panel unit in each of a series of clip positions in the direction of sliding thereof, the lip yieldably supported by the panel unit.

12. In a conversion kit for use with radio structure including a vehicle radio housing and a front trim panel, and adapting to the panel and radio as well as to an instrument panel that receives the radio, the kit comprising (a) a unitary mounting panel unit having an opening therethrough to receive a frontwardly projecting portion of the radio structure, the mounting panel being rectangular and having flange means, and defining four corners, longitudinally elongated opposite edges and laterally elongated opposite edges, (b) the panel unit forming four pairs of slots extending in said flange means, respectively located proximate said four corners, the slots of each pair being longitudinally spaced apart to selectively receive and retain on locking clip in one slot of each pair, the slots oriented so that the four clips are selectively receivable in the slots to unidirectionally slide relative to the plane of the panel unit into retaining engagement with edge portions of the instrument panel, while also adjustably attaching to the panel unit to block reverse sliding thereof, (c) the panel unit having longitudinally spaced, longitudinally elongated openings that extends forwardly therethrough to receive forwardly elongated fasteners defined by the radio structure, each of said openings located generally between slots that are laterally spaced apart, (d) and including said four locking clips received and retained in said selected slots, the clips having base plates defining multiple shoulders engageable against panel unit shoulders in each of a series of clip positions as the clips are caused to slide unidirectionally in said slots, thereby to block reverse sliding of the clips, the clips also having guide ribs extending in planes normal to said base plates and in the direction of clip sliding, the ribs guidedly received in other slots defined by the panel unit, the clips also having legs connected to the base plates, the ribs interconnecting the base plates and legs, and the ribs engagable with edge portions of the panel.

13. In a conversion kit for use with radio structure including a vehicle radio housing and a front trim panel, and adapting to the panel and radio as well as to an instrument panel that receives the radio, the kit comprising:

(a) a mounting panel unit having an opening therethrough to receive a frontwardly projecting portion of the radio structure, the mounting panel being rectangular and having flange means, and defining four corners, longitudinally elongated opposite edges and laterally elongated opposite edges, (b) the panel unit forming multiple slots at said flange means, certain slots located peripherally of the panel unit, the slots being longitudinally spaced apart to selectively receive and retain locking clips, the slots oriented so that a number of clips are receivable in the slots to unidirectionally slide into retaining engagement with edge portions of the instrument panel, while also adjustably attaching to the panel unit to block reverse sliding thereof, (c) and including said clips which are generally L-shaped to have serrated base plates that extend adjustably in said slots, each clip also having guide rib means extending substantially normal to said base plate and in the direction of clip sliding, and the slots oriented to guidedly receive both the base plate and rib means of each clip, the clips also having legs connected to the base plates, the rib means interconnecting the base plates and legs, and the rib means engagable with edge portions of the panel.

14. The kit of claim 13 wherein said slots are formed by said flange means which projects away from the panel unit.

15. The kit of claim 13 including said instrument panel structure engaged by said clips, and said radio retained to the panel unit and received in a well defined by the instrument panel structure.

16. The kit of claim 13 wherein the panel also forms additional slots proximate said laterally elongated opposite edges for reception of additional clips to project rearwardly from a plane defined by the panel unit, and to fittingly and yieldably engage instrument panel structure.

17. The kit of claim 16 including said additional clips which are angled and have legs received in said additional slots.

18. The kit of claim 17 wherein said additional clips are metallic spring clips that include cantilevered tongues which have elbows to deflect upon engagement with instrument panel edge structure and block retraction of the clips and panel unit.

19. The kit of claim 18 wherein said legs are hook-shaped to extend rearwardly into said additional slots thereby to resist panel unit forward retraction relative to the instrument panel edge structure when said elbows and panel edge structure block spring clip retraction forwardly.

20. In a conversion kit for use with radio structure including a vehicle radio housing and a front trim panel, and adapting to the panel and radio as well as to an instrument panel that receives the radio, the kit comprising:
    (a) a mounting panel unit having an opening therethrough to receive a frontwardly projecting portion of the radio structure, the mounting panel being rectangular and having flange means, said unit defining four corners, longitudinally elongated opposite edges and laterally elongated opposite edges,
    (b) the panel unit forming multiple slots at said flange means, certain slots located proximate said four corners, the slots being longitudinally spaced apart to selectively receive and retain locking clips, the slots oriented so that clips are receivable in the slots to unidirectionally slide into retaining engagement with edge portions of the instrument panel, while also adjustably attaching to the panel unit to block reverse sliding thereof,
    (c) and including said clips which are generally L-shaped to have serrated base plates that extend adjustably in said slot, each clip also having guide rib means extending substantially normal to said base plate and in the direction of clip sliding, and the slots oriented to guidedly receive both the base plate and rib means of each clip, the clips also having legs connected to the base plates, the rib means interconnecting the base plates and legs, and the rib means engagable with edge portions of the panel.

21. In a conversion kit for use with radio structure including a vehicle radio housing and a front trim panel, and adapting to the panel and radio as well as to an instrument panel that receives the radio, the kit comprising:
    (a) a unitary mounting panel unit having an opening therethrough to receive a frontwardly projecting portion of the radio structure, the mounting panel being rectangular and having flange means, and defining four corners, longitudinally elongated opposite edges and laterally elongated opposite edges,
    (b) the panel unit forming slots extending in said flange means, respectively located proximate said four corners, the slots being longitudinally spaced apart to selectively receive and retain one locking clip in one slot of each pair, the slots oriented so that the clips are selectively receivable in the slots to unidirectionally slide relative to the plane of the panel unit into retaining engagement with edge portions of the instrument panel, while also adjustably attaching to the panel unit to block reverse sliding thereof,
    (c) the panel unit having longitudinally spaced, longitudinally elongated openings that extend forwardly therethrough to receive forwardly elongated fasteners defined by the radio structure, each of said openings located generally between slots that are laterally spaced apart,
    (d) and including said locking clips received and retained in said selected slots, the clips having base plates with multiple shoulders engagable against panel unit shoulders as the clips are caused to slide unidirectionally in said slots, thereby to block reverse sliding of the clips, each clip also having guide rib means extending substantially normal to said base plate and in the direction of clip sliding, and the slots oriented to guidedly receive both the base plate and rib means of each clip, the clips also having legs connected to the base plates, the rib means interconnecting the base plates and legs, and the rib means engagable with edge portions of the panel.

* * * * *

UNITED STATES PATENT AND TRADEMARK OFFICE
CERTIFICATE OF CORRECTION

PATENT NO. : 4,756,495

DATED : July 12, 1988

INVENTOR(S) : Rob R. Putman

It is certified that error appears in the above-identified patent and that said Letters Patent is hereby corrected as shown below:

On the Title Page, Item [19] "Putnam" should read -- Putman --.

Item [75] "Rob R. Putnam" should read

-- Rob R. Putman --.

Signed and Sealed this

Eleventh Day of October, 1988

Attest:

DONALD J. QUIGG

Attesting Officer

Commissioner of Patents and Trademarks